June 21, 1960   N. R. GOLDSTEIN   2,942,099
OPTICAL PROJECTION SYSTEM
Filed April 11, 1958
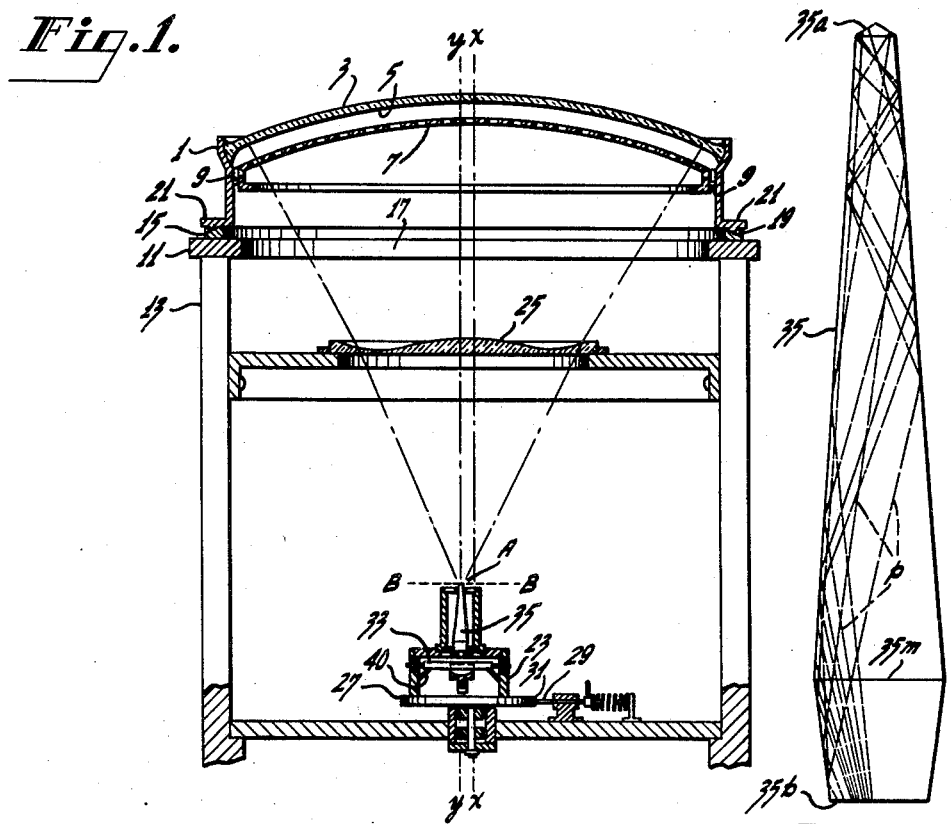
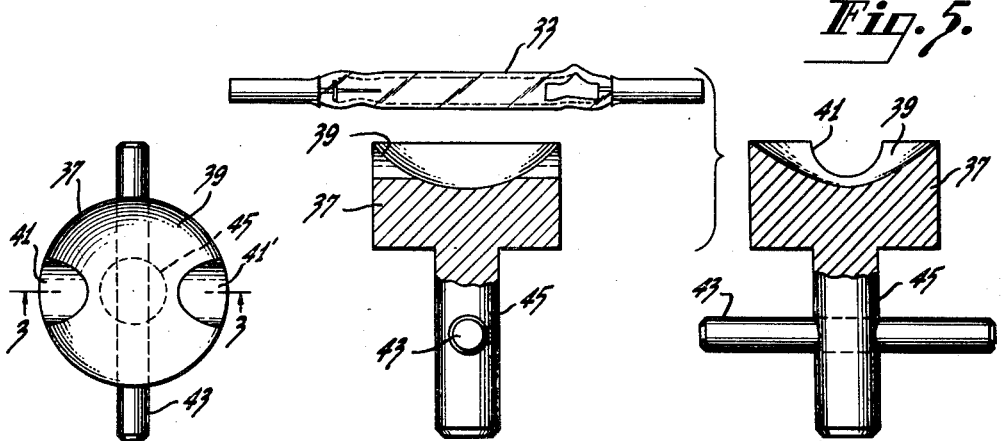
INVENTOR.
NORMAN R. GOLDSTEIN
BY
Roderick Malcolm
ATTORNEY United States Patent Office 2,942,099
Patented June 21, 1960

2,942,099

OPTICAL PROJECTION SYSTEM

Norman R. Goldstein, Lancaster, Pa., assignor to Radio Corporation of America, a corporation of Delaware Filed Apr. 11, 1958, Ser. No. 727,817

5 Claims. (Cl. 240—1)

This invention relates to improvements in optical projection systems of the kind wherein it is necessary or desirable to employ a cylindrical (instead of circular) lamp as the primary source of a circular, shadow-free, spot of light.

In certain photo-exposure apparatus, notably apparatus of the kind (exemplified by Epstein et al. U.S.P. 2,817,-276) used in the manufacture of color-phosphor screens, the primary source of light usually comprises a high pressure, high power, mercury-vapor lamp (such, for example, as a one kilowatt, General Electric Co. bulb, type BH6). One reason for using such a lamp is that its light output is so intense that the exposure time can be quite short. Such a lamp has a cylindrical envelope and the optical system associated therewith usually includes a quartz rod which picks up the laterally elongated bundle of rays from the cylinder and converts it into a substantially circular spot of light which is used in making the photographic exposure.

The principal object of the present invention is to provide an improved optical system of the general character described and one characterized (a) by its highly efficient use of the light output of the primary source and (b) by the enhanced brilliance and absence of irregularities in the circular shape of the spot-of-light derived from said primary source.

The foregoing and related objects are achieved in accordance with the invention by the provision of a reflector of a novel (parabolo-spherical) configuration which converts the laterally elongated bundle of rays from the cylindrical lamp into a circular light beam prior to impressing the same upon a substantially "leak-proof" light-conduit of a novel (doubly tapered) configuration wherein any image or shadow of the source is removed by multiple internal reflections.

The invention is described in greater detail in connection with the accompanying single sheet of drawings wherein:

Fig. 1 is an elevational view, partly in section, of a photo-exposure apparatus similar to the "lighthouse" shown in U.S.P. 2,817,276 but having an optical system which includes a "leak-proof" quartz rod and a reflector of the novel configuration taught by the present invention.

Fig. 2 is a plan view of an enlarged scale of the light-reflector shown in Fig. 1;

Fig. 3 is an exploded view of the lamp and reflector with the reflector partly in section, the section being taken on the line 3—3 of Fig. 2;

Fig. 4 is an elevational view of the reflector and its support, and including a transverse section of the reflecting surface; and Fig. 5 is a longitudinal section, on an enlarged scale of the quartz rod, shown in Fig. 1, the drawing being marked with lines indicative of the "leak-proof" paths of the light-rays therethrough.

In Fig. 1, 1 designates the cylindrical metal or glass side wall of the "front end" of a color-kinescope (not shown) of the 3-gun shadow-mask variety at that stage of its manufacture whereat the inner or "target" surface of its face-plate or screen 3 has been provided with a coating 5 comprising a photographic emulsion for recording the mosaic pattern impressed thereon by reason of the presence of the tube's shadow-mask 7 in the path of light rays emanating from small area or a "point" A (later described) corresponding to the small area or point transversed by one of the three electron-beams in the tube's normal plane-of-deflection. Assuming that the point A in the plane-of-deflection B—B is the one traversed by the "red" beam in such a kinescope, then the emulsion coating 5 on the target surface of the screen 3 may contain a red-phosphor such, for example as manganese activated zinc phosphate.

The apertured shadow-mask 7 (which, like the screen-plate 3, is here shown in the form of a circular section of spherical shell), is removably supported on the inner surface of the side-wall 1 as on three or more pins 9 to permit the mask to be removed from the assembly during the three emulsion-coating and developing operations incident to laying down the three (red, blue and green) color-phosphors. It is of course necessary that the screen-unit (i.e. the screen-plate 3 and its apertured mask 7) be aligned very accurately with respect to the point A and, to this end, the metal cylinder 1 within which said unit is supported, and the top 11 of the table or pedestal 13 upon which said cylinder is mounted, are provided with a suitable indexing mechanism. The indexing mechanism here shown comprises three radially extending V-grooves 15 disposed in circumferentially spaced relationship about the central opening 17 in the table-top 11 and a similar number of protuberances 19 formed in the sealing flange 21 about the lower edge of the cylinder 1 within which the screen-unit is mounted. The protuberances 19 have rounded terminals which engage the slanting sides of the V-grooves 15 and hence provide a self-leveling, self-centering support which holds the screen-unit accurately centered on the vertical axis x—x of the pedestal. The optical system of the lighthouse of Fig. 1 comprises a source of light (later described) contained within a box 23 adjacent to the base of the lighthouse and a correcting lens 25 interposed between the light-source and the shadow-mask. As more fully described in U.S.P. 2,817,276, the lens 25 and the other elements of the optical system are designed, positioned and arranged to cause the light rays to impinge upon the same elemental areas of the screen plate 3 as will the beam-electrons during operation of the complete tube.

As above mentioned the source of light for the optical system of the lighthouse is contained within a box 23. This box is mounted on a turntable or turret 27 for rotation about the central axis x—x of the lighthouse. The turntable 27 serves to bring the point A of the system to the position of any one of the three-beams in the normal plane-of-deflection of the 3-gun color-kinescope in which the screen-unit 3, 7 is to be used. A suitable indexing mechanism, which may comprise a spring loaded plunger 29 which seats in appropriately spaced dwells 31 in the rim of the turntable 27, ensures the accurate location of the point A of the optical system.

The primary source of light within the box 25 preferably comprises an ultra-violet lamp 33, such as a General Electric Co. one kilowatt high pressure mercury arc lamp, type BH6. Ultra-violet rays of wave-length of from say, 3200 to 4500 Angstroms, are preferred because their use permits the described screen-plotting operation to be carried out practically in day-light. This mercury-vapor lamp comprises a thin cylinder or tube 33 and has a light-emitting central portion about one inch long which is disposed with its center on the "light axis" y—y of the system. This light axis y—y corresponds to the axis of origin of one of the electron-beams and is parallel to the central axis x—x of the lighthouse when the turntable 27 is in any one of its three previously described positions.

As previously mentioned, the present invention provides an optical system wherein the elongated bundle of rays from a tubular lamp 33 is converted into a circular spot of light prior to being impressed upon a substantially "leak-proof" light conduit 35 wherein any image or shadow of the lamp is removed by multiple internal reflections. The conversion of the elongated bundle of rays into a circular spot of light is effected by a contrivance 37 (see Figs. 2–4) adjacent to which the lamp 33 is supported above a reflecting surface 39 which takes the form of a portion of the surface generated by rotating a parabola around a line parallel to its latus rectum and within the parabola. The lamp is supported (as on brackets 40 within the box) at the focus of the parabola (see Fig. 4) forming one of the cross-sections of the reflecting surface 39 and at the center of the circle (see Fig. 3) forming the cross-section of the reflector for a plane perpendicular to the first (parabolic) cross section. Two oppositely located grooves 41, 41' (Fig. 2) in the side walls of the reflector provide a clearance space for the cylindrical bulb 33 when it is mounted in the prescribed position. The body forming the base of the reflecting surface 39 here takes the form of a T-shape block of aluminum which is supported within the box 23 on the turntable 27 as by a removable pin 43 which extends through the vertical arm 45 of the T.

The input end 35b of the light conduit 35 is presented to the focal point of the rays reflected from the circular (see Fig. 3) and parabolic (see Fig. 4) surfaces of the reflector, and said rays are conducted along the light axis y—y, within the conduit 35 by multiple internal reflections, to the point A which, in the instant case, lies in or closely adjacent to the normal plane-of-deflection B—B. The light conduit 35 is a solid body constituted essentially of a medium denser than air, i.e. of a material having a high index of refraction and of high transparency to rays of the wave lengths emanating from the lamp. Having regard also to the heat generated as an incident to the operation of the lamp 33 this conduit or collimator is preferably constituted of quartz or of heat resisting glass such as "pyrex." Optically clear fused quartz is to be preferred to less clear "pyrex." It will be observed that the quartz rod 35 as shown in Fig. 5 is not of uniform diameter, nor is it uniformly tapered, but on the contrary is tapered in opposite directions from an area 35m of maximum diameter intermediate its input and output ends, 35b, 35a. It is this double taper that renders the conduit substantially "leak-proof." That is to say it has been found that few, if any, of the paths p of the internally reflected rays within such a doubly tapered conduit intersect the side-walls of the conduit at an angle (i.e. the "critical angle," which in this case was 42°41') which would permit the rays to escape from the conduit through its side-walls. (In Fig. 5, the paths p of but a few of the entering rays are plotted.)

In one successful embodiment of the invention wherein the light output was increased by 60% over the optical system hereto employed in the commercial production of color-phosphor screens, the shape and dimensions of the parabola-spherical reflecting surface were as follows: ¾" diameter. Radius of spherical cross-section: 0.4687". Equation of parabolic cross-section: $x = 4/3y^2$, where $x$ is the direction of depth. Maximum depth: ⅜₁₆" and the dimensions of the doubly tapered collimator were: Length: 3.198". Length of back taper: 0.645". Length of forward taper to aperture: 2.448". Height of tip above aperture: 0.105". Diameter of aperture 0.190". Maximum diameter 0.487". Base diameter 0.375". Angle of back taper: 5°. Angle of forward taper 3°29'.

From the foregoing it should now be apparent that the present invention provides an improved optical system for photo-exposure apparatus and one characterized by its highly efficient use of the light output of its (cylindrical) primary source and by the enhanced brilliance and absence of irregularities in the circular shape of the spot of light derived from said primary source.

What is claimed is:

1. An optical system for deriving a substantially shadow-free circular spot of light from a cylindrical lamp, said system comprising a parabolo-spherical reflecting surface disposed adjacent to said lamp with the lamp at the focus of the parabola forming one of the cross-sections of the reflector and adjacent to the center of the circle forming the cross-section of the reflector for a plane perpendicular to said first mentioned cross-section, and a light conduit disposed in a position to receive the circular bundle of rays reflected from said surface, said light conduit being constituted essentially of a medium denser than air and adapted to transmit said received rays from one end of said conduit to the other by multiple internal reflections and thus to suppress any shadows in the entering circular bundle of rays.

2. The invention as set forth in claim 1 and wherein said light conduit comprises a quartz rod having a region of maximum diameter intermediate its ends, the input end of said rod being closer to said region of maximum diameter than the output end thereof and the walls of said conduit tapering in opposite directions from said ends to said region of maximum diameter.

3. The combination with a lamp having a substantially cylindrical bulb, of means for deriving a substantially circular spot of light from said cylindrical bulb, said means comprising a parabolo-spherical reflecting surface and means for supporting said cylindrical bulb at the focus of the parabola forming one of the cross-sections of said reflector and adjacent to the center of the circle forming the cross-section of the reflector for a plane perpendicular to said first mentioned cross-section.

4. The invention as set forth in claim 3 and wherein said reflecting surface comprises a portion of the surface generated by rotating a parabola around a line parallel to its latus rectum and within the parabola.

5. The invention as set forth in claim 3 and wherein said parabola-spherical reflecting surface contains a pair of seats disposed at opposite ends of an axis of the parabola forming one of the cross-sections of said surface, said seats forming a clearance space for the curved surface of said cylindrical lamp bulb.

References Cited in the file of this patent

UNITED STATES PATENTS

| | | |
|---|---|---|
| 1,800,277 | Boerstler | Apr. 14, 1931 |
| 1,967,548 | Bartels | July 24, 1934 |
| 2,015,344 | Kosten | Sept. 24, 1935 |
| 2,187,071 | Bergmans | Jan. 16, 1940 |
| 2,480,178 | Zinberg | Aug. 30, 1949 |
| 2,600,514 | Mitchell | June 17, 1952 |
| 2,693,524 | Harris | Nov. 2, 1954 |
| 2,817,276 | Epstein et al. | Dec. 24, 1957 |
| 2,844,710 | Zensser | July 22, 1958 |
| 2,885,935 | Epstein et al. | May 12, 1959 |